(29.) *William A. Clark's Imp't in Hollow Augers*
No. 121,707.                                   Patented Dec. 12, 1871.
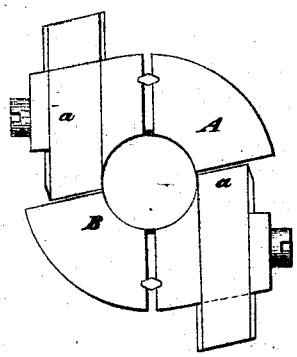
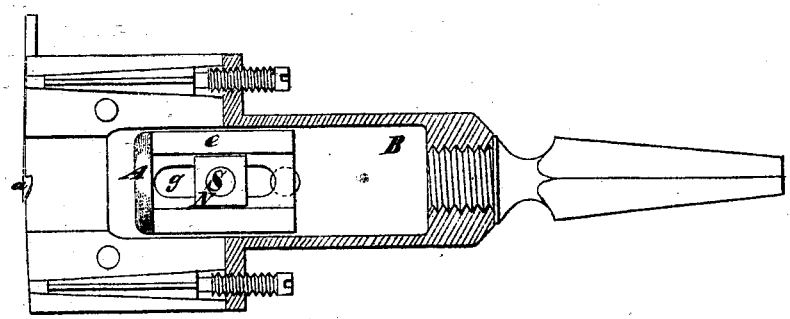
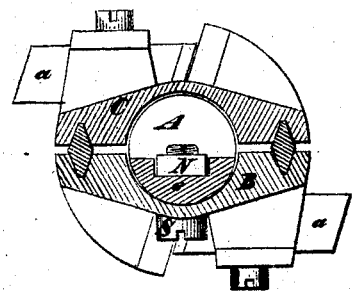
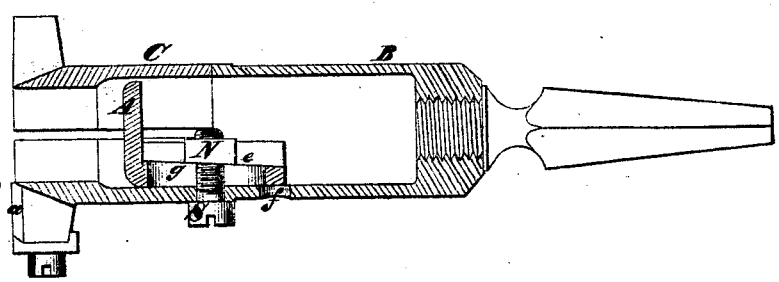
Witnesses:                         William A. Clark
Fred Haynes                        per Brown Coombs
J W Coombs                                   Attorneys 121,707

UNITED STATES PATENT OFFICE.

WILLIAM A. CLARK, OF WOODBRIDGE, CONNECTICUT.

IMPROVEMENT IN HOLLOW AUGERS.

Specification forming part of Letters Patent No. 121,707, dated December 12, 1871.

*To all whom it may concern:*

Be it known that I, WILLIAM A. CLARK, of Woodbridge, in the county of New Haven and State of Connecticut, have invented a new and useful Improvement in Hollow Augers for Tenoning Spokes, &c.; and I do hereby declare that the following is a full, clear, and exact description thereof, reference being had to the accompanying drawing forming a part of this specification.

My invention relates to hollow augers; and the invention consists in providing the auger with a stop having an inclined or beveled shank held in place by a set-screw, whereby the stop is more securely held in position and prevented from being accidentally displaced, as hereinafter more fully described.

In the accompanying drawing, Figure 1 is an end view of a hollow auger having my stop applied. Fig. 2 is a longitudinal section of the same. Fig. 3 is a transverse section thereof, and Fig. 4 is a longitudinal section taken at right angles to Fig. 2.

Similar letters of reference indicate corresponding parts in all the figures.

The stop consists of a round plate or head, extending perpendicularly from one side of which is a tail-like piece, $e$, having a longitudinal slot, $g$, and above this slot guides for the reception of a square nut, $N$, into which a screw, $S$, which passes through a hole in the auger, is screwed to clamp the stop in position. The shank or body $e$ of the stop $A$, where it is slotted, is beveled or inclined longitudinally, growing gradually thicker toward its head, so that when it is set in position and the screw $S$ is tightened up the stop is prevented from slipping or being pushed farther in. And this is an important feature, inasmuch as in cutting the tenons on hard-seasoned oak or hickory spokes and similar articles considerable force has necessarily to be used to feed the cutters up to their work, and there is, therefore, danger that the stop may be moved out of position and by this means cut the tenons too long, thus spoiling the work. By this method of securing the stop this is avoided, and at the same time it is capable to any degree desired. The stop may be adjusted the whole length of its slot by unscrewing the screw $S$ and sliding the stop along the auger; and if desirable to slide it farther back than permitted by the screw in this position, the screw may be removed from its hole and inserted into another hole, $f$, farther back in the auger, and screwed into the nut $N$ to clamp the stop, as before. By this stop the length of the tenons to be cut may be very accurately regulated, and their shoulders are enabled to be smoothly cut all round, as, instead of stopping the rotation of the auger to finish the tenon, or merely drawing back the spoke or other article being tenoned and so leaving a ridge at the abrupt termination of the cut, the feed is stopped by the end of the tenon coming against the stop and the rotary motion is continued until the cutters cut themselves clear.

I am aware that a stop has heretofore been applied to hollow augers, and therefore I do not claim, broadly, such application; but Having described my invention, what I claim is—

The stop $A$ having the beveled slotted shank $e$, constructed and arranged to operate in connection with a hollow auger, as herein set forth.

WM. A. CLARK.

Witnesses:
FRED. HAYNES,
FERD. TUSCH. (29)